United States Patent [19]
Tabata et al.

[11] Patent Number: 5,936,387
[45] Date of Patent: Aug. 10, 1999

[54] GATE DRIVE CIRCUIT FOR POWER CONVERTERS THAT REDUCES SURGE VOLTAGES

[75] Inventors: Masafumi Tabata; Seiki Igarashi, both of Tokyo, Japan

[73] Assignee: Fuji Electric Co., Ltd., Kawasaki, Japan

[21] Appl. No.: 08/951,228

[22] Filed: Oct. 16, 1997

[30] Foreign Application Priority Data

Oct. 17, 1996 [JP] Japan ................................. 8-274477

[51] Int. Cl.⁶ ....................................................... G05F 3/16
[52] U.S. Cl. ........................ 323/225; 323/271; 323/289; 363/56
[58] Field of Search ................................. 323/223, 225, 323/271, 282, 289; 363/56, 124

[56] References Cited

U.S. PATENT DOCUMENTS

| | | | |
|---|---|---|---|
| 4,288,738 | 9/1981 | Rogers et al. | 323/271 |
| 4,796,145 | 1/1989 | Oshikiri | 363/56 |
| 4,864,214 | 9/1989 | Billings et al. | 323/289 |
| 5,204,504 | 4/1993 | Tanaka | 323/289 |
| 5,552,695 | 9/1996 | Schwartz | 323/271 |
| 5,808,455 | 9/1998 | Schwartz et al. | 323/271 |

OTHER PUBLICATIONS

A Study on Soft–Switching Gate Drive for IGBTS, Hideki Miyazaki, Kazuo Kato (Hitachi Ltd.), pp. 289–292, Sep. 1997.

A New Driving Circuit for IGBT Devices, IEEE Transactions on Power Electronics, vol., 10, No. 3, May 1995, pp. 373–378.

*Primary Examiner*—Jeffrey Sterrett
*Attorney, Agent, or Firm*—Kanesaka & Takeuchi

[57] ABSTRACT

A current detector includes a chopper circuit composed of a switching circuit, i.e. an inverse-parallel circuit composed of an insulated gate bipolar transistor IGBT and a diode, and a switching circuit, i.e. an inverse-parallel circuit composed of an IGBT and a diode, which are connected in series. When the diode on the opposite arm is turned on, a reverse recovery current is detected and its output is directed to a gate drive circuit via an insulating circuit. A switch in the gate drive circuit is opened to increase resistance, in order to reduce the speed at which the gate of the switching device is charged. Thus, the surge voltage and its increase ratio are reduced without reducing a switching speed or requiring a snubber circuit.

8 Claims, 4 Drawing Sheets

$V_{CE}$: collector-emitter voltage of IGBT
$i_c$: collector current of IGBT
$i_d$: diode current
$V_d$: diode voltage

GATE DRIVE CIRCUIT FOR POWER CONVERTERS THAT REDUCES SURGE VOLTAGES

BACKGROUND OF THE INVENTION AN RELATED ART STATEMENT

The present invention relates to a gate drive circuit for a voltage-driven switching device, such as an insulated gate bipolar transistor (IGBT).

FIG. 6 shows a conventional example of a chopper circuit comprising such a voltage-driven switching device and a gate drive circuit.

A switching circuit 1 composed of an IGBT 1a and a diode 1b connected inversely in parallel thereto is connected in series to a switching circuit 2 composed of an IGBT 2a and a diode 2b connected inversely in parallel thereto, and both ends of a combination of these circuits are connected to a DC power supply 9 via a wiring inductance 11. In addition, a load inductance 10 is connected to both ends of the switching circuit 2, and a capacitor 12 is connected as a snubber circuit to both ends of a series circuit composed of the switching circuits 1 and 2. In addition, a gate drive circuit 3 is connected to the IGBT 1a. The gate drive circuit 3 includes DC power supplies 7a and 7b connected in series; a resistor 8a connected at one end to a positive electrode side of the DC power supply 7a; a switch 6a connected at one end to the other end of the resistor 8a; a switch 6b connected at one end to the other end of the switch 6a; and a resistor 8b connected at one end to the other end of the switch 6b, and to a negative electrode side of the DC current 7b at the other end thereof. A gate terminal of the IGBT 1a is connected to the connection between the switches 6a and 6b, and an emitter terminal of the IGBT 1a is connected to the connection between the DC power supplies 7a and 7b.

The chopper circuit shown in FIG. 6 turns the IGBT 1a on and off to adjust an output power. This operation is illustrated in FIG. 7.

First, the switch 6a in the gate drive circuit 3 is closed, while the switch 6b is opened. A current depending on the DC power supply 7a, the resistor 8a and the input capacitance of the IGBT 1a is allowed to flow through the gate terminal of the IGBT 1a as a main switch to provide an electric charge between the gate and emitter in order to turn on the IGBT 1a. Once the IGBT 1a has been turned on, a current io (see FIG. 6) flows through its output. Then, the switch 6a of the gate drive circuit 3 is opened while the switch 6b is closed to discharge the electric charge between the gate and emitter of the IGBT 1a, thereby turning off the IGBT 1a. This causes the current flowing through the load inductance 10 to flow through the diode 2b for circulation. This current is called as a free wheeling current. In this manner, the power supplied to the load can be adjusted by repeatedly turning the main switch on and off.

Such a chopper circuit has the following problems:

Since the diode 2b is on-state by the free wheeling current flowing through the load inductance 10 immediately after the IGBT 1a has been turned on, a current path is formed between the IGBT 1a and the diode 2b, and the current through the diode 2b rapidly decreases when a current increase ratio di/dt of the IGBT 1a is large. The diode 2b then starts a reverse recovery to interrupt the current, so the wiring inductance 11 causes a surge voltage of its inductance 11 multiplied by the current increase ratio di/dt plus an intermediate DC voltage Ed, such as one shown in FIG. 7, which is applied to the diode 2b. Required are devices that can withstand this surge voltage. However, the devices with high withstanding voltage increase costs and result in an increased forward voltage drop, to thereby increase steady loss and reduce conversion efficiency.

Alternatively, to absorb the surge voltage, a snubber circuit 12 such as one shown in FIG. 6 may be installed parallel to the series circuit of the switching circuits. But this method decreases conversion efficiency caused by loss to the snubber circuit and increases both apparatus size and cost, due to installation of the snubber circuit.

Alternatively, to inhibit the surge voltage, a gate resistance may be increased to reduce the voltage decrease ratio dv/dt of the IGBT. But this method reduces a switching speed to increase the switching loss. The increase in the switching loss necessitates a larger cooling fan, leading to a bulkier and more expensive apparatus.

The object of the invention is to reduce costs without increasing apparatus size or reducing conversion efficiency.

SUMMARY OF THE INVENTION

To achieve this object, an invention according to a first aspect provides a series circuit made of switching circuits, i.e. first and second circuits, each in turn being made of a voltage-driven switching device (referred to as a "first or second switching device") including an insulated gate bipolar transistor and a diode connected inversely in parallel thereto.

The series circuit includes a gate drive circuit for the device; a current detector for detecting a reverse recovery current through a diode connected inversely in parallel to the device in the switching circuit on the opposite arm or second circuit; and an insulating circuit for insulating a detection signal from the detector for transmission. In a condition that the first switching device is turned on, upon detecting a reverse recovery current through the diode, the current detector transmits a detection signal to the gate drive circuit via the insulating circuit to reduce the speed at which the gate of the first switching device is charged.

In this invention, according to the first aspect, the current detector may only be connected in series to the diode on the opposite arm (an invention according to a second aspect), or a current detection and insulating circuit may be replaced by a small saturation type reactor with a saturation magnetic flux that uses a secondary coil wound around it (an invention according to a third aspect).

Furthermore, in the invention according to the third aspect, the current detection and insulating circuit may be connected parallel to a wiring inductance that is connected in series only to the diode on the opposite arm (an invention according to a fourth aspect).

An invention according to a fifth aspect provides a series circuit comprising switching circuits, i.e. first and second circuits, each comprising a voltage-driven switching device (referred to as a "first or second switching device") including an insulated gate bipolar transistor and a diode connected inversely in parallel thereto.

The series circuit includes a gate drive circuit for the device; a voltage detector for detecting an inverse voltage in a diode connected inversely parallel to the device in the switching circuit on the opposite arm or second circuit; and an insulating circuit for insulating a detection signal from the detector for transmission. In a condition that the first switching device is turned on, upon detecting a reverse voltage in the diode, the voltage detector transmits a detection signal to the gate drive circuit via the insulating circuit to reduce the speed at which the gate of the device is charged.

DETAILED DESCRIPTION OF PREFERRED EMBODIMENTS

Figure 1:
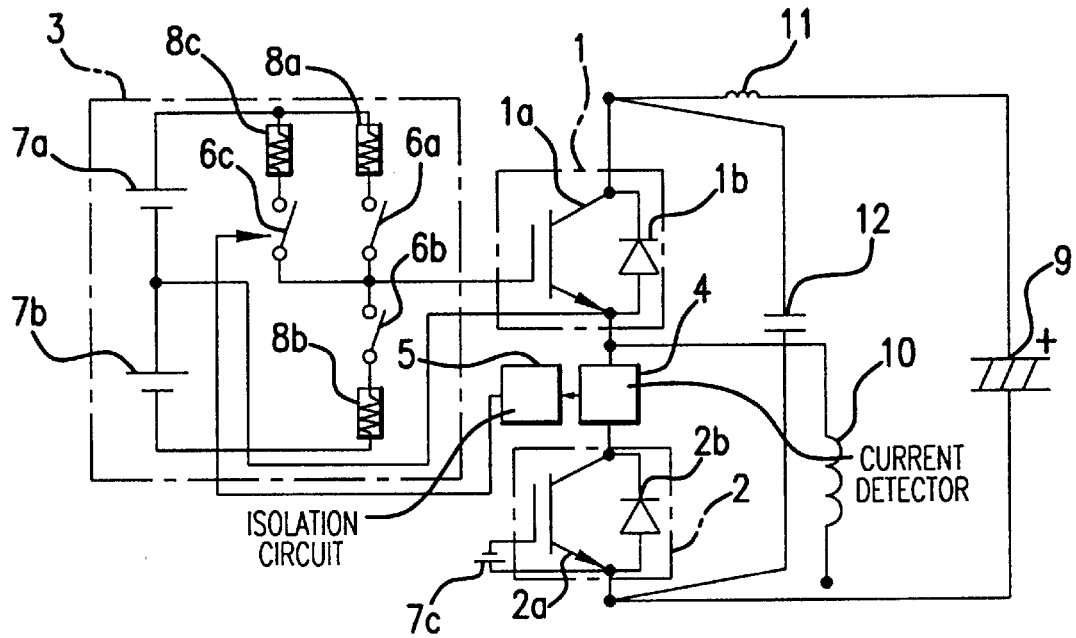
FIG. 1 is a circuit diagram showing a first embodiment of this invention.

FIG. 1 is a circuit diagram showing an embodiment of this invention.

A current detector 4 is inserted in series to a switching circuit 2, and an insulating circuit 5 is connected to the output of the current detector 4. The output of the insulating circuit 5 is directed to a gate drive circuit 3 to open a switch 6c.

That is, to turn on the IGBT 1a, switches 6a and 6c are closed and a switch 6b is opened. Thus, the gate current for the IGBT 1a is supplied to the gate of the IGBT 1a via resistors 8a and 8c disposed in parallel. When the IGBT 1a is turned on, a current flows from the positive electrode of a DC intermediate capacitor 9 through the IGBT 1a, the current detector 4, and a diode 2b to the negative electrode of the DC intermediate capacitor 9. When this current becomes "0" and an inverse current starts to flow, i.e. when the diode 2b permits a reverse recovery current, the current detector 4 outputs a signal to the insulating circuit 5.

On receiving this signal, the insulating circuit 5 insulates and transmits it to the gate drive circuit 3 and opens the switch 6c to reduce the gate charging speed. When the switch 6c is opened, the gate current charged in the IGBT 1a is provided only from a resistor 8a and becomes larger than the value of the parallel resistance of the resistors 8a and 8c, thereby reducing the gate current. When the gate current decreases, the switching speed of the IGBT 1a falls, then the collector-emitter voltage remains in a higher value than the value when the gate current is large because the voltage of an IGBT during the turn-on period depends on the magnitude of the gate current supplied to the IGBT and decreases with increase of the gate current. The presence of a voltage in the IGBT 1a reduces the increase in a current flowing into the IGBT 1a from the DC intermediate capacitor 9, so that the surge voltage applied to the diode 2b during the reverse recovery period is reduced and therefore, an excessive voltage applied to the diode 2b can be suppressed.

Once the reverse recovery period of the diode is done, no current flows through the current detector 4, thus preventing signal generation. As a result, no signal is provided to the insulating circuit 5 to close the switch 6c, and normal operation is restored. The parallel resistance of the resistors 8a and 8c has a standard value, and the value of the resistance of the resistor 8a is selected to be about ten times as large as that of this standard value.

Figure 2:
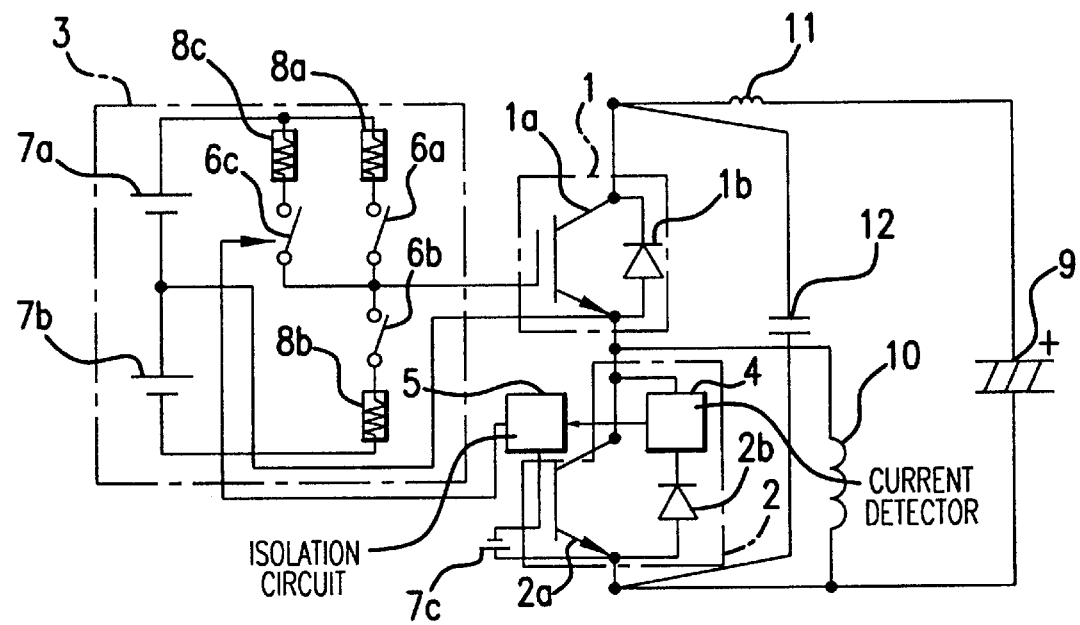
FIG. 2 is a circuit diagram showing a second embodiment of this invention.

FIG. 2 is a circuit diagram showing a second embodiment of this invention.

FIG. 2 differs from FIG. 1 in that the current detector 4 is connected in series only to the diode 2b. This configuration has exactly the same basic operation as illustrated in FIG. 1, so a description is omitted. Since this configuration prevents a current flowing through the IGBT 2a from flowing through the current detector 4, the size of the current detector 4 may be reduced as compared to FIG. 1.

Figure 3:
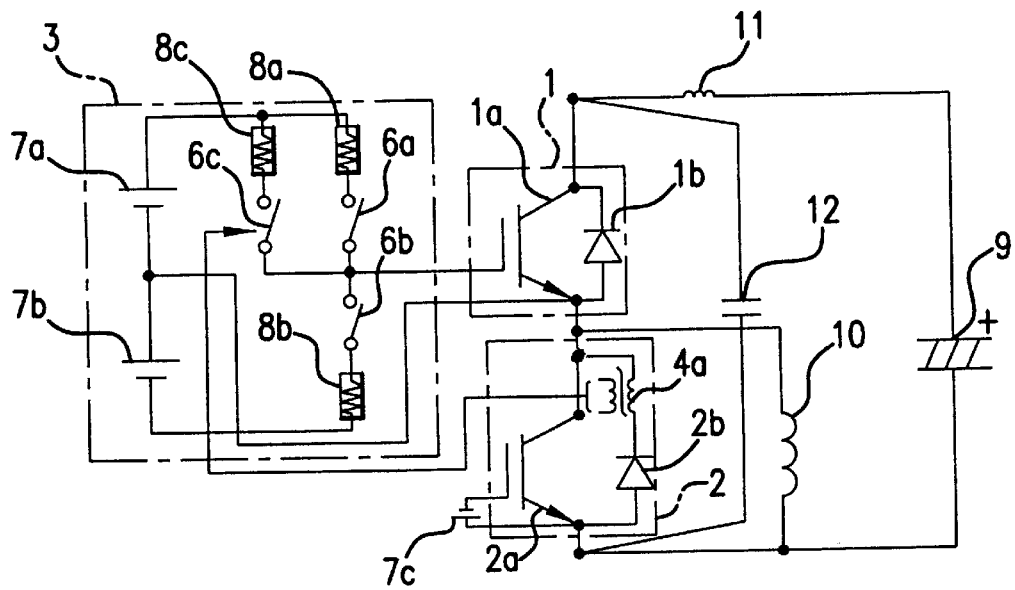
FIG. 3 is a circuit diagram showing a third embodiment of this invention.

FIG. 3 is a circuit diagram showing a third embodiment of this invention.

In this embodiment, a saturation type reactor 4a with a secondary coil connected in series to the diode 2b is inserted so that its output is transmitted to the gate drive circuit 3 via the secondary coil. In this case, when the IGBT 1a is turned on, a current flows through the diode 2b, and when the current through the diode 2b enters the reverse recovery period, a positive voltage is generated on the secondary side of the saturation type reactor 4a. Thus, opening of the switch 6c can restrain the surge voltage applied to the diode 2b. That is, the saturation type reactor 4a acts as a current detection and insulating circuit having both current detection and current insulating functions, and can be made smaller than the circuit in FIG. 1. Although the saturation type reactor 4a is only connected in series to the diode 2b, it can be inserted in series to the inverse-parallel circuit composed of the diode 2b and the IGBT 2a.

Figure 4:
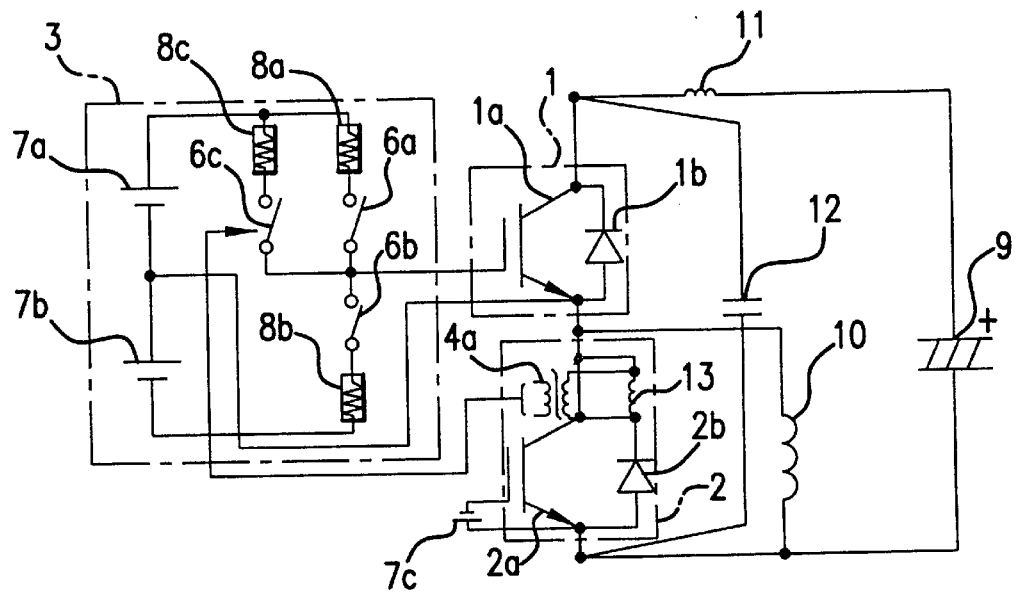
FIG. 4 is a circuit diagram showing a fourth embodiment of this invention.

FIG. 4 is a circuit diagram showing a fourth embodiment of this invention.

This configuration has the characteristic that the primary side of a saturation type reactor 4a similar to the saturation type reactor in FIG. 3 is connected parallel to a wiring inductance 13 for the diode 2b. In this case, the current flowing through the diode 2b is shunted to the primary side of the saturation type reactor 4a and the wiring inductance 13, and a current flows through the saturation type reactor 4a depending on a shunt ratio. That is, when the current through the diode 2b enters the recovery period, a positive voltage is generated on the secondary side of the saturation type reactor 4a. Thus, opening of the switch 6c can restrain the surge voltage applied to the diode 2b. That is, the saturation type reactor 4a acts as a current detection and insulating circuit having both current detection and current insulating functions, and can be smaller than the circuit in FIG. 3 because the current flowing through the saturation type reactor 4a is a fraction of the current flowing through the diode 2b. Again, although the saturation type reactor 4a is connected parallel only to the wiring inductance 13 for the diode 2b, it can be inserted parallel to the wiring inductance for the inverse-parallel circuit composed of the diode 2b and the IGBT 2a.

Figure 5:
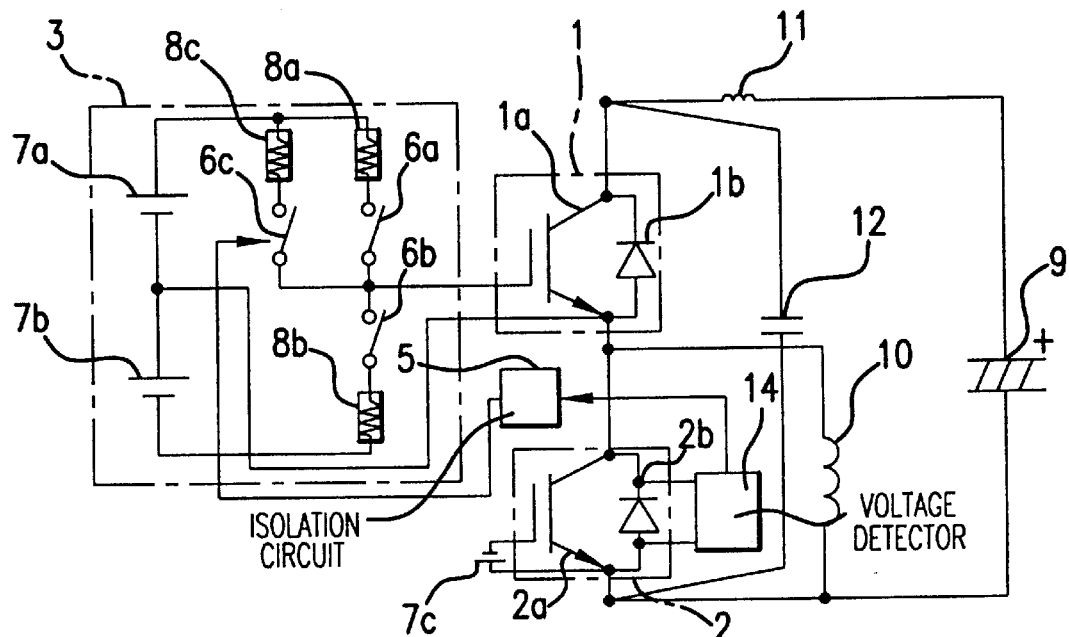
FIG. 5 is a circuit diagram showing a fifth embodiment of this invention.
Figure 6:
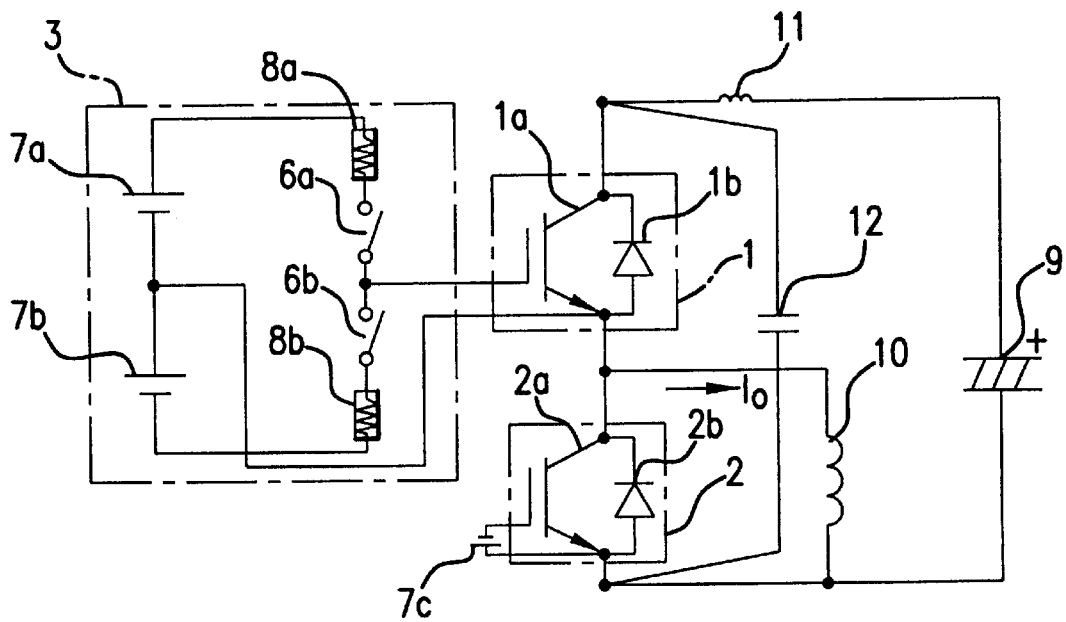
FIG. 6 is a circuit diagram showing a conventional example of a chopper circuit.
Figure 7:
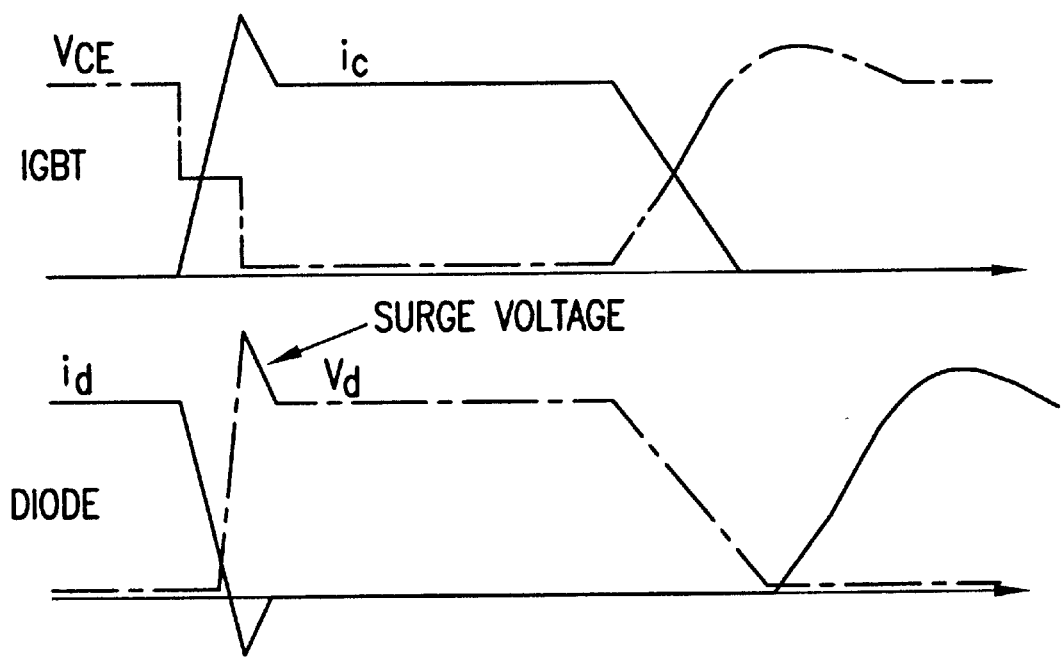
FIG. 7 illustrates an operation of FIG. 6.

FIG. 5 is a circuit diagram showing a fifth embodiment of this invention.

As seen from this figure, this embodiment is configured by installing an inverse voltage detection circuit 14 for the diode 2b parallel to the diode 2b. Thus, when the diode 2b enters the reverse recovery period, an inverse voltage occurs in the diode 2b. Thus, the inverse voltage is detected by the inverse voltage detection circuit 14, which is insulated in the insulating circuit 5 and transmitted to the gate drive circuit 3, so that the surge voltage applied to the diode 2b can be restrained as described above. This circuit obviates the need for a circuit for detecting a diode current and substantially eliminates a conducting loss to the detection circuit.

In addition to the above chopper circuit, this invention is, of course, applicable to an inverter circuit that allows the gate drive circuit 3 to be connected instead of a DC power supply 7c and has a series circuit composed of a switching circuit 1 and the switching circuit 2.

Since the invention according to the first aspect detects a reverse recovery current through the diode on the opposite arm or second circuit and insulates a detection signal for transmission to reduce the speed at which the gate of the switching element of a first circuit is charged, the following effects are obtained.

(a) By reducing a gate charging speed only during a reverse recovery of the diode, an almost equal switching speed can be obtained as compared to the conventional methods. Since a surge voltage can be restrained at an almost equal switching speed, the increase in switching loss can be minimized.

(b) Since a surge voltage can be restrained, devices with high voltage resistance is eliminated. In general, since the element with low withstanding voltage has a lower forward voltage relative to the element with high withstanding voltage, and has a fast switching characteristic, a conversion efficiency of the apparatus is improved.

(c) A snubber circuit for restraining a surge voltage is eliminated, thereby reducing the apparatus size. Also, since the loss by the snubber circuit becomes "0", a conversion efficiency of the apparatus is improved.

Incidentally, the snubber circuit 12 shown in FIGS. 1 to 5 is provided to inhibit the surge voltage while the IGBT 1a is off.

In the invention according to the second aspect, the size of the current detector can be reduced because it can be connected only to the current path for the diode, in order to prevent the effects of the current through the IGBT connected inversely in parallel to the diode.

In the invention according to the third aspect, since the saturation type reactor has both current detection and current insulating functions, it is possible to reduce the number of required parts, and thus costs.

In the invention according to the fourth aspect, since the diode current is shunted to the primary side of the saturation type reactor to reduce the current through the current detector, the size of the current detector can be further reduced.

The invention according to the fifth aspect eliminates a current detection circuit for detecting a diode current, thereby eliminating a conducting loss to the detection circuit and a reducing loss to the apparatus in order to improve the conversion efficiency.

What is claimed is:

1. A gate drive circuit for a power converter, comprising:
   a first circuit composed of a first voltage-driven switching device and a first diode connected inversely in parallel thereto;
   a second circuit connected in series to the first circuit, said second circuit being composed of a second voltage-driven switching device and a second diode connected inversely in parallel thereto;
   a gate drive circuit for said first switching device connected to said first circuit; and
   current detecting means for detecting a reverse recovery current of the second diode, said current detecting means being connected to the second diode and the gate drive circuit so that when the current detecting means detects a reverse recovery current passing through the second diode at a time of turning-on of the first switching device, said current detecting means transmits a detection signal to said gate drive circuit to reduce a gate charging speed of the first switching device, resulting in reducing a gate current of the first switching device.

2. A gate drive circuit for a power converter according to claim 1, wherein said current detecting means is formed of a current detector for detecting the reverse recovery current of the second diode, and an insulating circuit connected between the current detector and the gate drive circuit, said insulating circuit insulating the detection signal from the current detector to transfer the detection signal to the gate drive circuit.

3. A gate drive circuit for a power converter according to claim 2, wherein said current detector is connected in series only to the second diode of the second circuit.

4. A gate drive circuit for a power converter according to claim 1, wherein said current detecting means is a current detection and insulating circuit formed of a saturating type reactor with a small saturation magnetic flux having a secondary coil therearound.

5. A gate drive circuit for a power converter according to claim 4, further comprising a wiring inductance connected in series only to the second diode, said current detection and insulating circuit being connected parallel to the wiring inductance.

6. A gate drive circuit for a power converter according to claim 1, wherein said voltage-driven switching device is an insulated gate bipolar transistor.

7. A gate drive circuit for a power converter, comprising:
   a first circuit composed of a first voltage-driven switching device and a first diode connected inversely in parallel thereto;
   a second circuit connected in series to the first circuit, said second circuit being composed of a second voltage-driven switching device and a second diode connected inversely in parallel thereto;
   a gate drive circuit for said first switching device connected to said first circuit; and
   voltage detecting means for detecting a reverse recovery voltage of the second diode, said voltage detecting means being connected to the second diode and the gate drive circuit so that when the voltage detecting means detects a reverse recovery voltage passing through the second diode at a time of turning-on of the first switching device, said voltage detecting means transmits a detection signal to said gate drive circuit to reduce a gate charging speed of the first switching device.

8. A gate drive circuit for a power converter according to claim 7, wherein said voltage detecting means is formed of a voltage detector for detecting the reverse recovery voltage of the second diode, and an insulating circuit connected between the voltage detector and the gate drive circuit, said insulating circuit insulating the detection signal from the voltage detector to transfer to the gate drive circuit.

* * * * *